United States Patent
Anglin et al.

(10) Patent No.: US 10,018,063 B2
(45) Date of Patent: Jul. 10, 2018

(54) ANTI-ROTATION KNIFE EDGE SEALS AND GAS TURBINE ENGINES INCLUDING THE SAME

(71) Applicant: UNITED TECHNOLOGIES CORPORATION, Hartford, CT (US)

(72) Inventors: Christopher T. Anglin, Manchester, CT (US); Yuk-Kwan Brian Yuen, Wethersfield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 610 days.

(21) Appl. No.: 14/735,938

(22) Filed: Jun. 10, 2015

(65) Prior Publication Data

US 2016/0362994 A1    Dec. 15, 2016

(51) Int. Cl.
*F16J 15/00*    (2006.01)
*F01D 11/00*    (2006.01)
*F01D 5/02*    (2006.01)
*F16J 15/16*    (2006.01)

(52) U.S. Cl.
CPC .............. *F01D 11/00* (2013.01); *F01D 5/025* (2013.01); *F01D 11/001* (2013.01); *F16J 15/16* (2013.01); *F05D 2220/32* (2013.01); *F05D 2240/55* (2013.01); *F05D 2260/30* (2013.01)

(58) Field of Classification Search
CPC ........ F01D 11/00; F01D 11/001; F01D 5/025; F16J 15/16; F16J 15/00; F05D 2220/32; F05D 2240/55; F05D 2260/30
USPC ........................................................ 277/500
See application file for complete search history.

(56) References Cited

U.S. PATENT DOCUMENTS

| | | | | |
|---|---|---|---|---|
| 3,295,825 A | * | 1/1967 | Hall, Jr. ................... | F01D 5/06 415/173.7 |
| 3,768,924 A | * | 10/1973 | Corsmeier .............. | F01D 5/081 416/95 |
| 3,814,539 A | * | 6/1974 | Klompas ................. | F01D 5/081 415/115 |
| 4,701,105 A | * | 10/1987 | Cantor .................. | F01D 5/3015 416/220 R |
| 5,173,024 A | * | 12/1992 | Mouchel ................ | F01D 5/066 416/220 R |

* cited by examiner

Primary Examiner — Nathan Cumar
(74) Attorney, Agent, or Firm — Snell & Wilmer L.L.P.

(57) ABSTRACT

Anti-rotation knife edge seals and gas turbine engines including the same are provided. The anti-rotation knife-edge seal includes a first end portion having at least one knife edge, an opposing second end portion including an outside peripheral edge having a nut anti-rotation feature and an inside peripheral edge having a shaft anti-rotation feature, and an intermediate portion extending between the first end portion and the opposing second end portion. The first end portion, the opposing second end portion, and the intermediate portion form a one-piece annular seal member. A method is also provided for substantially preventing rotation of a stack nut against an adjacent rotatable component.

17 Claims, 6 Drawing Sheets

ANTI-ROTATION KNIFE EDGE SEALS AND GAS TURBINE ENGINES INCLUDING THE SAME

FIELD

The present disclosure relates to gas turbine engines, and more specifically, to anti-rotation knife edge seals and gas turbine engines including the same.

BACKGROUND

Gas turbine engines may include multiple gas flows at different temperatures and pressures. For example, the engine may have a primary or core air flow and a separate cooling air flow. In some locations, seals may be used to prevent or limit the gas flow from one area of the engine to another and/or to maintain separation of the different gas flows.

Gas turbine engines also include a plurality of rotating and stationary components. These components may be secured and positioned axially via stack nuts and spacers so as to take in tolerances to minimize the overall size and weight of the gas turbine engine. A stack nut fits on an outer diameter of and is inhibited from rotation against an adjacent rotatable component by using a key washer. The key washer fits in a set of slots in the stack nut and the adjacent rotatable component. The key washer itself has a series of tabs, or keys, that are sized, numbered, and oriented such that the key washer interfaces and is retained between the stack nut and the adjacent rotatable component. Unfortunately, the key washer is an extra engine part, providing extra complexity and cost to the gas turbine engine. Moreover, where space is limited in the gas turbine engine, insertion of the key washer between the stack nut and adjacent rotatable component may be difficult.

SUMMARY

An anti-rotation knife-edge seal in accordance with various embodiments comprises a first end portion having at least one knife edge, an opposing second end portion including an outside peripheral edge having a nut anti-rotation feature and an inside peripheral edge having a shaft anti-rotation feature, and an intermediate portion extending between the first end portion and the opposing second end portion. The first end portion, the opposing second end portion, and the intermediate portion form a one-piece annular seal member.

A gas turbine engine in accordance with various embodiments comprises a rotatable component having an outer surface with anti-rotation shaft interface geometry. A stack nut is engagable on the rotatable component and includes anti-rotation nut interface geometry. An anti-rotation knife-edge seal comprises a first end portion having at least one knife edge, an opposing second end portion, and an intermediate portion extending between the first end portion and the opposing second end portion. The opposing second end portion includes an outside peripheral edge having a nut anti-rotation feature and an inside peripheral edge having a shaft anti-rotation feature. The nut and shaft anti-rotation features are complementary to and interface with respectively the anti-rotation nut interface geometry and the anti-rotation shaft interface geometry. The first end portion, the opposing second end portion, and the intermediate portion form a one-piece annular seal member that engages the stack nut on the rotatable component to substantially prevent loosening and tightening rotation of the stack nut.

A method is provided for substantially preventing rotation of a stack nut against an adjacent rotatable component, according to various embodiments. The method comprises tightening, to a selected assembly torque, the stack nut and adjacent rotatable component together to form a stack nut and component assembly. An anti-rotation knife-edge seal is inserted between the stack nut and the adjacent rotatable component of the stack nut and component assembly. The anti-rotation knife edge seal comprises a first end portion having at least one knife edge, an opposing second end portion including an outside peripheral edge having a nut anti-rotation feature and an inside peripheral edge having a shaft anti-rotation feature, and an intermediate portion extending between the first end portion and the opposing second end portion. The first end portion, the opposing second end portion, and the intermediate portion form a one-piece annular seal member. The anti-rotation knife-edge seal is rotated until the nut and shaft anti-rotation features respectively engage the anti-rotation nut interface geometry and the anti-rotation shaft interface geometry. The stack nut is tightened on the anti-rotation knife-edge seal and the adjacent rotatable component to a predetermined torque setting.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, toward the axis of rotation of a turbine engine.

Various embodiments are directed to anti-rotation knife-edge seals and gas turbine engines including the same. The anti-rotation knife-edge seal may engage a stack nut and an adjacent rotatable component in the gas turbine engine to prevent at least one of loosening or tightening rotation of the stack nut (i.e., anti-rotates the stack nut) against the adjacent rotatable component. In that regard, a key washer may not be present. Eliminating the key washer reduces the gas turbine engine part count and cost, and the difficulty of its use due to space limitations within the gas turbine engine. As there may be more than one anti-rotation knife-edge seal used in a single gas turbine engine, the space, part, and cost savings by eliminating the key washer may be significant. The anti-rotation knife-edge seal also prevents gas flow from at least one area of the gas turbine engine to another.

Figure 1:
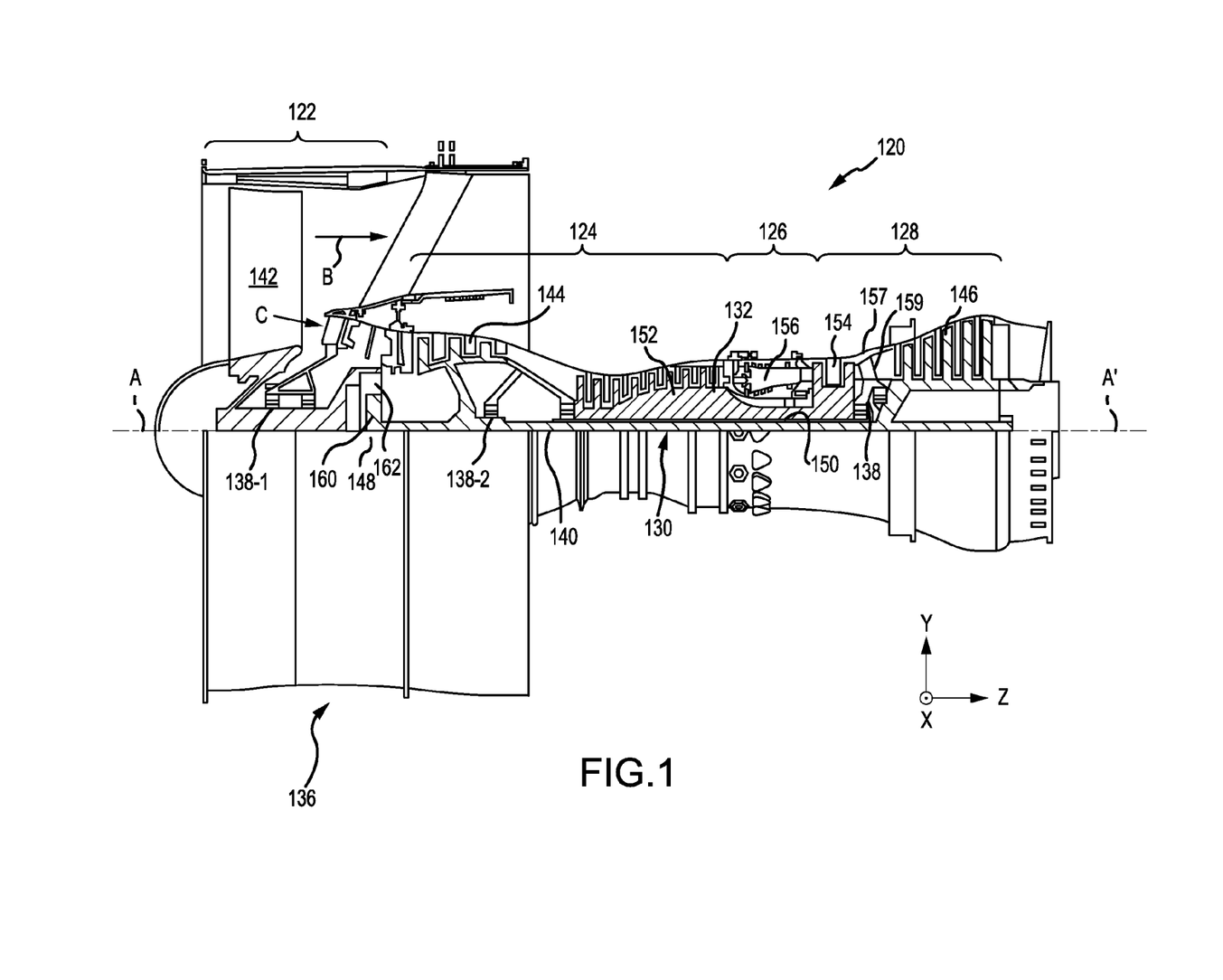
FIG. 1 is a cross-section of an exemplary gas turbine engine.

In various embodiments and with reference to FIG. 1, a gas-turbine engine 120 including an anti-rotation knife-edge seal 200 (with momentary reference to FIG. 2) is provided. With reference to FIG. 1, gas-turbine engine 120 may be a two-spool turbofan that generally incorporates a fan section 122, a compressor section 124, a combustor section 126 and a turbine section 128 (each may be referred to herein as "a gas turbine engine section.") Alternative engines may include, for example, an augmentor section among other systems or features. In operation, fan section 122 can drive coolant along a bypass flow-path B while compressor section 124 can drive coolant along a core flow-path C for compression and communication into combustor section 126 then expansion through turbine section 128. Although depicted as a turbofan gas-turbine engine 120 herein, it should be understood that the concepts described herein are not limited to use with turbofans as the teachings may be applied to other types of gas turbine engines including three-spool and other architectures.

Gas turbine engine 120 may generally comprise a low speed spool 130 and a high speed spool 132 mounted for rotation about an engine central longitudinal axis A-A' relative to an engine static structure 136 via one or more bearing systems 138 (shown as bearing system 138-1 and bearing system 138-2 in FIG. 1). It should be understood that various bearing systems 138 at various locations may alternatively or additionally be provided including, for example, bearing system 138, bearing system 138-1, and bearing system 138-2. A bearing system is located within a bearing compartment.

Low speed spool 130 may generally comprise an inner shaft 140 that interconnects a fan 142, a low pressure (or first) compressor section 144 and a low pressure (or first) turbine section 146. Inner shaft 140 may be connected to fan 142 through a geared architecture 148 that can drive fan 142 at a lower speed than low speed spool 130. Geared architecture 148 may comprise a gear assembly 160 enclosed within a gear housing 162. Gear assembly 160 couples inner shaft 140 to a rotating fan structure. High speed spool 132 may comprise an outer shaft 150 that interconnects a high pressure compressor ("HPC") 152 (e.g., a second compressor section) and high pressure (or second) turbine section 154. A combustor 156 may be located between HPC 152 and high pressure turbine 154. A mid-turbine frame 157 of engine static structure 136 may be located generally between high pressure turbine 154 and low pressure turbine 146. Mid-turbine frame 157 may support one or more bearing systems 138 in turbine section 128. Inner shaft 140 and outer shaft 150 may be concentric and rotate via bearing systems 138 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 144 then HPC 152, mixed and burned with fuel in combustor 156, then expanded over high pressure turbine 154 and low pressure turbine 146. Mid-turbine frame 157 includes airfoils 159 which are in the core airflow path. Low pressure turbine 146 and high pressure turbine 154 rotationally drive the respective low speed spool 130 and high speed spool 132 in response to the expansion.

Gas turbine engine 120 may be, for example, a high-bypass geared aircraft engine. In various embodiments, the bypass ratio of gas turbine engine 120 may be greater than about six (6). In various embodiments, the bypass ratio of gas turbine engine 120 may be greater than ten (10). In various embodiments, geared architecture 148 may be an epicyclic gear train, such as a star gear system (sun gear in meshing engagement with a plurality of star gears supported by a carrier and in meshing engagement with a ring gear) or other gear system. Geared architecture 148 may have a gear reduction ratio of greater than about 2.3 and low pressure turbine 146 may have a pressure ratio that is greater than about 5. In various embodiments, the bypass ratio of gas turbine engine 120 is greater than about ten (10:1). In various embodiments, the diameter of fan 142 may be significantly larger than that of the low pressure compressor 144, and the low pressure turbine 146 may have a pressure ratio that is greater than about 5:1. Low pressure turbine 146 pressure ratio may be measured prior to inlet of low pressure turbine 146 as related to the pressure at the outlet of low pressure turbine 146 prior to an exhaust nozzle. It should be understood, however, that the above parameters are exemplary of various embodiments of a suitable geared architecture engine and that the present disclosure contemplates other gas turbine engines including direct drive turbofans.

Figure 2:
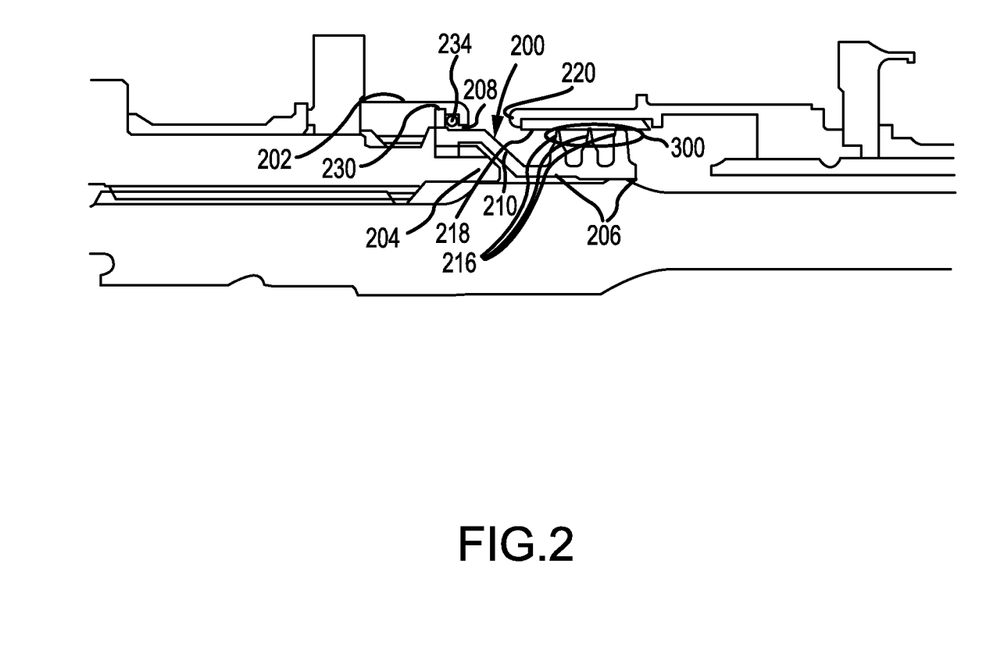
FIG. 2 is a cross-section of an anti-rotation knife-edge seal disposed within a bearing compartment within the gas turbine engine of FIG. 1, according to various embodiments of the present disclosure.
Figure 3A:
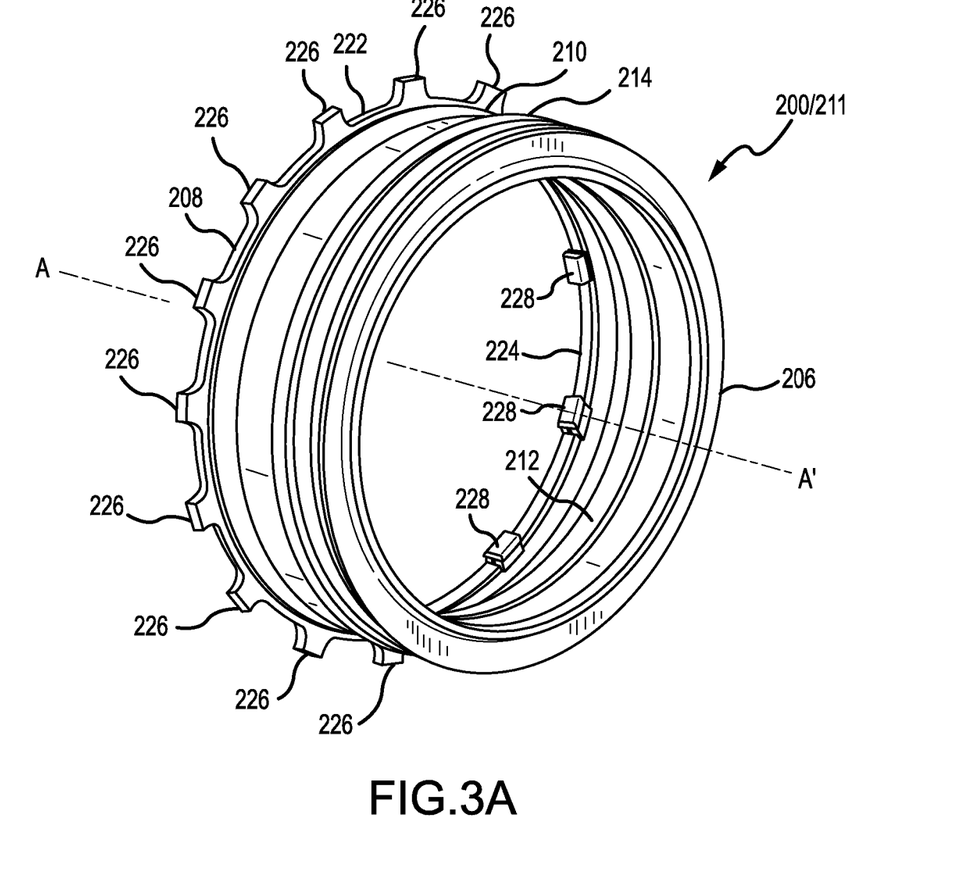
FIG. 3A illustrates a perspective view of the anti-rotation knife-edge seal of FIG. 1, in accordance with various embodiments of the present disclosure.
Figure 3B:
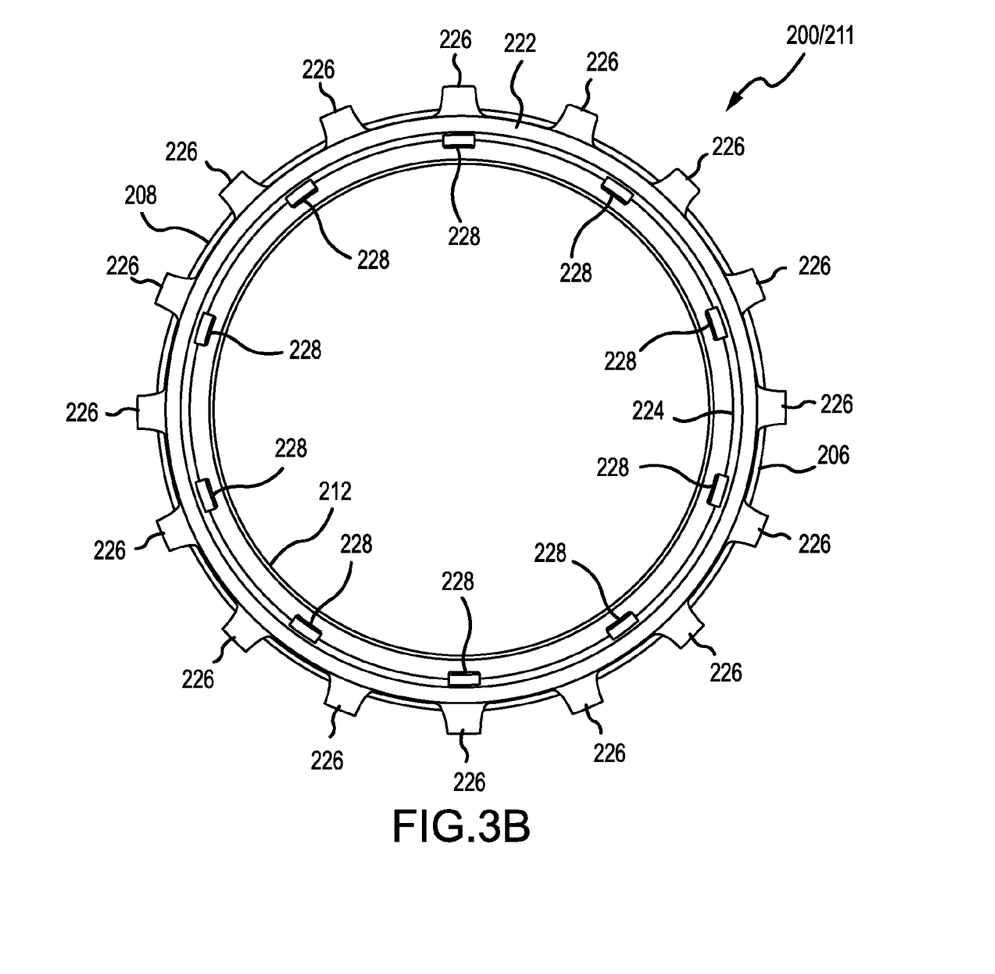
FIG. 3B is a perspective view, from an opposite direction, of the anti-rotation knife-edge seal of FIG. 3A, in accordance with various embodiments of the present disclosure.
Figure 4:
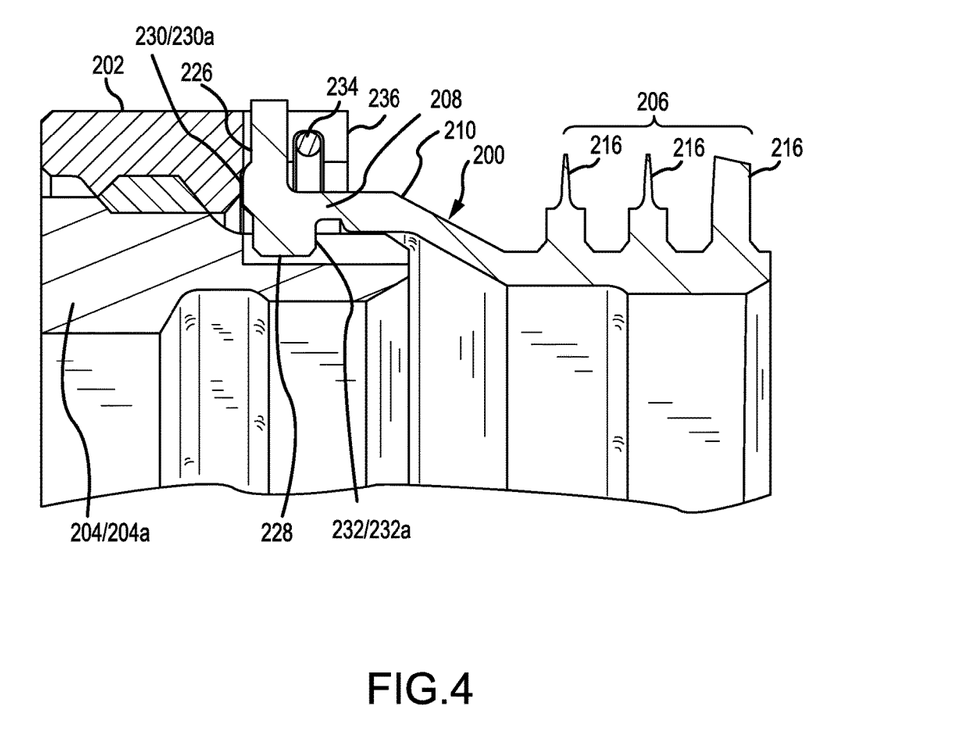
FIG. 4 is a sectional view of the anti-rotation knife-edge seal of FIGS. 3A and 3B engaged between a stack nut and a stub shaft (an exemplary adjacent rotatable component) in the gas turbine engine of FIG. 1 to substantially prevent rotation of the stack nut relative to the anti-rotation knife-edge seal and the stub shaft, in accordance with various embodiments of the present disclosure.

The anti-rotation knife-edge seal 200 (as illustrated in FIGS. 2 through 4) according to various embodiments may be included in a bearing compartment of the gas turbine engine 120 of FIG. 1. However, it is to be understood that the anti-rotation knife-edge seal 200 may advantageously be used elsewhere in the gas turbine engine 120 to substantially prevent rotation of a stack nut (or other nut) 202 relative to an adjacent rotatable component 204 (FIGS. 2 and 4) that rotates during engine operation.

FIGS. 3A and 3B are perspective views of the anti-rotation knife-edge seal 200 in accordance with various embodiments. In FIG. 3A, the anti-rotation knife-edge seal 200 is shown from aft looking forward. In FIG. 3B, anti-rotation knife-edge seal 200 is shown from forward looking aft. A' is aft of A. The anti-rotation knife-edge seal 200 has a first end portion 206, an opposing second end portion 208, and an intermediate portion 210. The first end portion 206, the opposing second end portion 208, and the intermediate portion 210 form a one-piece annular seal member 211 defining a central axis and including an inner surface 212 with an inner diameter and an outer surface 214 with an outer diameter. As depicted in FIGS. 3A and 3B, the one-piece annular seal member fits around (i.e., surrounds an outer surface of) the adjacent rotatable component against which rotation of the stack nut is substantially prevented by the anti-rotation knife-edge seal 200 as previously noted and hereinafter described.

With reference to FIGS. 2-4, the first end portion 206 has at least one knife edge 216 and defines the aft end of the anti-rotation knife-edge seal 200. While knife edges 216 are shown to be parallel, it is to be understood that other angular orientations may be possible. Moreover, while only three knife edges are shown, a greater or lesser number of knife edges may be used. The at least one knife edge 216 is configured to interface with an abradable sealing surface 218 of a surrounding engine component (rotatable or stationary) 220 (FIG. 2) as hereinafter described. The abradable sealing surface 218 interfaces with the outer diameter of the at least one knife edge 216.

Still referring to FIGS. 3A and 3B, the second end portion 208 includes an outside peripheral edge 222 and an inside peripheral edge 224. The outside peripheral edge 222 has nut anti-rotation features 226 and the inside peripheral edge 224 has shaft anti-rotation features 228. In various embodiments, the nut anti-rotation features 226 comprise a first plurality of tabs extending radially outwardly from the outside peripheral edge 222 of the anti-rotation knife-edge seal 200 and the shaft anti-rotation features 228 comprise a second plurality of tabs extending radially inwardly from the inside peripheral edge 224 of the anti-rotation knife-edge seal 200. While nut and shaft anti-rotation features 226 and 228 comprising tabs are depicted, it is to be understood that in various embodiments, the nut and shaft anti-rotation features may comprise different anti-rotation geometries, including flanges, slots, crenellations, or analogous anti-rotation features. The nut anti-rotation features may be the same or different than the shaft anti-rotation features. The nut anti-rotation features may themselves differ. The shaft anti-rotation features may similarly be different. While only ten nut anti-rotation features comprising tabs and three shaft anti-rotation features comprising tabs are depicted for ease of illustration, it is to be understood that the tabs may be circumferentially arranged and evenly spaced apart along the entire outside and inside peripheral edges of the second end portion 208 of the anti-rotation knife-edge seal 200. However, it is to be understood that the arrangement and spacing of the nut and/or shaft anti-rotation features along the outside and inside peripheral edges of the second end portion of the anti-rotation knife-edge seal 200 may be different than that depicted. For example, the nut anti-rotation features and/or the shaft anti-rotation features may not be arranged and spaced along the entire peripheral edges. The nut anti-rotation features and/or the shaft anti-rotation features may additionally or alternatively unevenly spaced along the outside and inside peripheral edges of the second end portion of the anti-rotation knife edge seal 200. The nut and shaft anti-rotation features have a selected number, spacing, and size relative to each other. It is the relative relationship between the selected count, spacing, and size of the nut and shaft anti-rotation features that enable engagement of the anti-rotation knife-edge seal 200 with the stack nut 202 and adjacent rotatable component 204 in a single engagement position regardless of the orientation of the stack nut 202 as hereinafter described. The relative number, spacing, and size between the nut and shaft anti-rotation features are calculated to permit the single engagement position.

The intermediate portion 210 between the first end portion 206 and the opposing second end portion 208 of the anti-rotation knife-edge seal 200 (i.e., between the knife(s) edges 216 and the anti-rotation features 226 and 228) may be configured to adjust for the particular surrounding engine structure (rotatable or stationary) (e.g., surrounding engine component 220 in FIG. 2). For example, with reference to FIGS. 2 and 4, the intermediate portion 210 is configured as an elongated portion with a gradual radial outward turn such that the second end portion 208 of the anti-rotation knife-edge seal 200 is disposed radially outward of the first end portion 206 in the one-piece annular seal member. It is to be understood that the configuration of the intermediate portion extending between the first and second end portions of the anti-rotation knife-edge seal 200 may vary depending upon the envelope of the particular surrounding engine structure(s) within the gas turbine engine.

Referring again to FIGS. 2 and 4, the nut anti-rotation features 226, with reference to FIGS. 3A through 4, are configured to complement and interface with anti-rotation nut interface geometry 230 in an outer surface of the stack nut 202. The stack nut 202 may be as known to one skilled in the art, with the exception of the anti-rotation nut interface geometry 230. While in the illustrated embodiments, the anti-rotation nut interface geometry 230 comprises slots 230a that complement and interface with the depicted tabs (nut anti-rotation features 226), it is to be understood that the anti-rotation nut interface geometry may be any anti-rotation interface geometry that complements and interfaces with the selected nut anti-rotation features. Exemplary anti-rotation nut interface geometry may include at least one of a slot, pocket, groove, tab, flange, etc. depending upon the anti-rotation geometry of the nut anti-rotation features. While the depicted slots (the anti-rotation nut interface geometry) are rectangular, it is to be understood that any shape complementary to the nut anti-rotation features may be used. Moreover, it is to be understood that the "slots" may be conventional slots, high aspect ratio apertures, cut-outs, etc.

The shaft anti-rotation features 228 are configured to complement and interface with anti-rotation shaft interface geometry 232 in an outer surface of the adjacent rotatable component (e.g., a stub shaft 204a in the depicted embodiment) 204. The shaft interface features in the outer surface of the component against which the stack nut is substantially prevented from rotating against comprise local anti-rotation features, although it is to be understood that the anti-rotation shaft interface geometry may be symmetrical. While in the depicted embodiment, the anti-rotation shaft interface geometry comprises slots 232a that complement and interface with the depicted tabs (exemplary shaft anti-rotation features), it is to be understood that the anti-rotation shaft interface geometry may be any anti-rotation interface geometry that complements and interfaces with the selected shaft anti-rotation features. Exemplary anti-rotation nut interface geometry may include slots, pockets, grooves, tabs, flanges, etc. depending upon the anti-rotation geometry of the shaft anti-rotation features. While the depicted slots are rectangular, it is to be understood that any shape complementary to the shaft anti-rotation features may be used. Thus, while nut and shaft anti-rotation features comprising tabs and nut and anti-rotation shaft interface geometry comprising slots are depicted, it is to be understood that in various embodiments, the nut and shaft anti-rotation features and interface geometry may comprise different anti-rotation geometries, including slots, crenellations, or analogous anti-rotation features. It is to be understood that the nut and anti-rotation features complement and interface with the anti-rotation nut interface geometry of the stack nut and the shaft anti-rotation features complement and interface with the anti-rotation shaft interface geometry of the adjacent rotatable component to rotationally lock (i.e., engage) the stack nut 202 relative to the anti-rotation knife-edge seal 200 and thereby relative to the adjacent rotatable component 204 as depicted in FIG. 4.

FIG. 4 is a partial cross-sectional view of the anti-rotation knife-edge seal 200 according to various embodiments engaged with the stack nut 202 and the adjacent rotatable component 204 against which the stack nut is substantially prevented from rotating. The adjacent rotatable component (the stub shaft 204a in the depicted embodiment) 204 carries the anti-rotation knife-edge seal 200 and stack nut 202. The stack nut engages the shaft outer surface to prevent the stack nut from loosening or tightening rotation relative to the anti-rotation knife-edge seal 200 and to the adjacent component as it rotates during engine operation. A retaining ring 234 may be seated within a pair of notches 236 in the stack nut 202 to retain the anti-rotation knife-edge seal 200 in position so that it cannot fall free of the stack nut or the component against which the stack nut is substantially prevented from rotating against.

Figure 5:
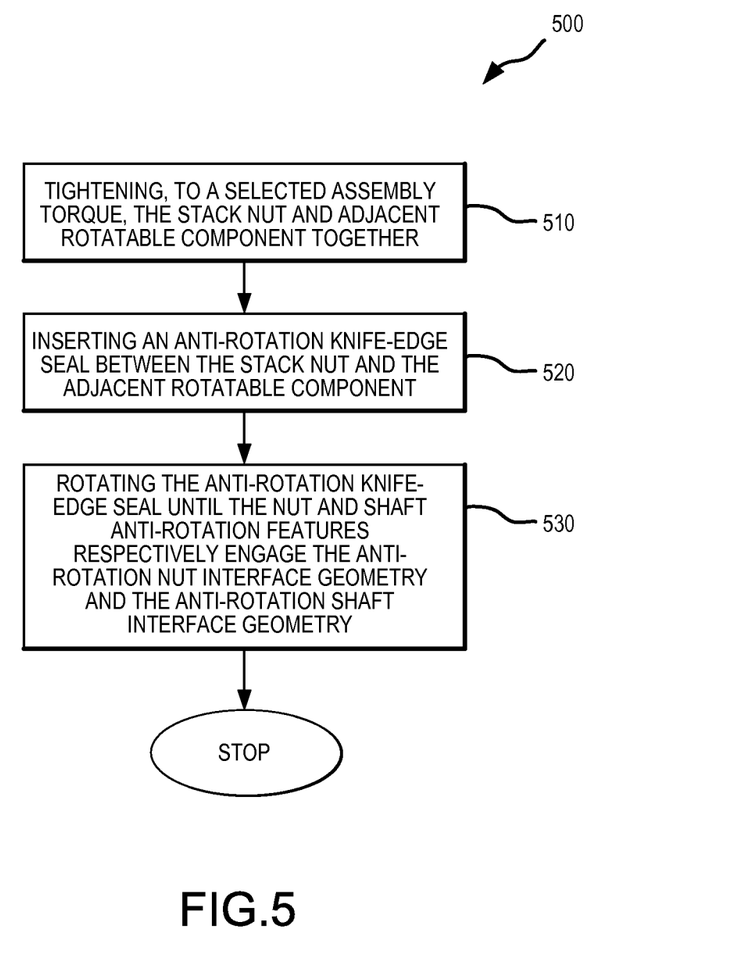
FIG. 5 depicts a flowchart illustrating an exemplary method for substantially preventing rotation of the stack nut against the adjacent rotatable component

Referring now to FIG. 5, a method 500 for substantially preventing rotation of the stack nut against the adjacent rotatable component is also provided. Method 500 for substantially preventing rotation of the stack nut against the adjacent rotatable component begins by tightening, to a selected assembly torque, the stack nut 202 and adjacent rotatable component 204 together to form a stack nut and component assembly (step 510). The stack nut 202 is assembled onto the outer surface of the adjacent rotatable component 204. All the components that underlie the stack nut (e.g., a spacer, etc.) may be included.

Method 500 for substantially preventing rotation of the stack nut against the adjacent rotatable component continues by inserting an anti-rotation knife-edge seal between the stack nut and the adjacent rotatable component of the stack nut and component assembly (step 520). A forward portion (comprising the second end portion) of the anti-rotation knife-edge seal 200 is then inserted between the stack nut and the component in the stack nut and component assembly as depicted in FIG. 4.

Method 500 for substantially preventing rotation of the stack nut against the adjacent rotatable component continues by rotating the anti-rotation knife-edge seal until the nut and shaft anti-rotation features respectively engage the anti-rotation nut interface geometry and the anti-rotation shaft interface geometry (step 530). The anti-rotation knife-edge seal 200 is then rotated until the nut and shaft anti-rotation features 226 and 228 at the opposing second end portion 208 of the anti-rotation knife-edge seal 200 respectively engage the anti-rotation nut interface geometry 230 and the anti-rotation shaft interface geometry 232. In various embodiments, there is one engagement position as noted previously, regardless of the stack nut orientation. The stack nut orientation may vary based on how thick the underlying components may be (thickness measured along the axial axis). An interference fit is thereby formed between the component and the anti-rotation knife edge seal to help retain and align the anti-rotation knife edge seal such that the adjacent component and anti-rotation knife edge seal 200 have the same center axis.

An interference fit may be formed by heating at least one of the anti-rotation knife edge seal 200 and the adjacent rotatable component and cooling the other of the anti-rotation knife edge seal 200 and the adjacent rotatable component or using an installer tool in the case of a relatively small interference fit. The anti-rotation knife-edge seal 200 brings the stack nut and adjacent component into loaded engagement, forming a tight fit between the stack nut and the adjacent component. Thereafter, the retaining ring 234 is slid into place between the notches 236 in the stack nut, retaining the anti-rotation knife edge seal 200 in position. When the anti-rotation knife-edge seal 200 is engaged between the stack nut and the adjacent rotatable component of the stack nut and component assembly as depicted in FIGS. 1 and 4, the anti-rotation knife edge seal substantially prevents the stack nut from tightening or loosening rotation relative to the anti-rotation knife-edge seal and the adjacent rotatable component.

In addition to anti-rotating the stack nut relative to the rotatable component, the anti-rotation knife-edge seal 200 according to various embodiments of the present disclosure also acts as a seal by reducing unwanted gas flow gaps between adjacent rotating and non-rotating components (i.e., stationary components) of gas turbine engines. The at least one knife edge 216 at the first end portion 206 of the anti-rotation knife-edge seal 200 is configured to form a seal (encircled region of FIG. 2) with the abradable sealing surface 218 of the surrounding engine component (e.g., surrounding engine component 220 of FIG. 2). As noted previously, the abradable sealing surface 218 interfaces with the outer diameter of the at least one knife edge 216.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An anti-rotation knife-edge seal comprising:
a first end portion having at least one knife edge;
an opposing second end portion including an outside peripheral edge having a nut anti-rotation feature and an inside peripheral edge having a shaft anti-rotation feature;
an intermediate portion extending between the first end portion and the opposing second end portion;
wherein the first end portion, the opposing second end portion, and the intermediate portion form a one-piece annular seal member;
wherein the one-piece annular seal member is configured to fit around an adjacent rotatable component against which a stack nut is substantially prevented from rotating by the anti-rotation knife-edge seal when the anti-rotation knife-edge seal is engaged with the stack nut and the adjacent rotatable component;
wherein the nut anti-rotation feature is configured to complement and interface with an anti-rotation nut interface geometry of the stack nut and the shaft anti-rotation feature is configured to complement and interface with an anti-rotation shaft interface geometry of the adjacent rotatable component to engage the anti-rotation knife-edge seal with the stack nut and the adjacent rotatable component and thereby substantially prevent rotation of the stack nut relative to the anti-rotation knife-edge seal and the adjacent rotatable component;
wherein the anti-rotation knife-edge seal is configured to substantially prevent the stack nut from tightening or loosening rotation relative to the anti-rotation knife-edge seal and the adjacent rotatable component;
wherein the adjacent rotatable component and the anti-rotation knife-edge seal form an interference fit and have a same central axis;
wherein the at least one knife edge is configured to interface with an abradable sealing surface of a surrounding structure to create a seal in response to the stack nut and the adjacent rotatable component being engaged with the anti-rotation knife-edge seal;
wherein the at least one knife edge is configured to form the seal with the abradable sealing surface of the surrounding structure; and
a closed retaining ring configured to be seated within notches in the stack nut to retain the anti-rotation knife-edge seal in an engaged position.

2. The anti-rotation knife-edge seal of claim 1, wherein the one-piece annular seal member defines the central axis and includes an inner surface and an outer surface.

3. The anti-rotation knife-edge seal of claim 1, wherein the nut anti-rotation feature comprises a plurality of nut anti-rotation features that are circumferentially arranged and spaced-apart around the outside peripheral edge of the opposing second end portion and the shaft anti-rotation feature comprises a plurality of shaft anti-rotation features that are circumferentially arranged and spaced-apart around the inside peripheral edge of the opposing second end portion.

4. The anti-rotation knife-edge seal of claim 3, wherein the plurality of nut anti-rotation features extend radially outward from the outside peripheral edge and the plurality of shaft anti-rotation features extend radially inward from the inside peripheral edge.

5. The anti-rotation knife-edge seal of claim 1, wherein the stack nut has the anti-rotation nut interface geometry in an outer surface thereof and the adjacent rotatable component has the anti-rotation shaft interface geometry in an outer surface thereof.

6. The anti-rotation knife-edge seal of claim 5, wherein the nut anti-rotation feature and the shaft anti-rotation feature each comprise a plurality of radially-extending tabs and the anti-rotation nut interface geometry and the anti-rotation shaft interface geometry each comprise a plurality of slots.

7. The anti-rotation knife-edge seal of claim 5, wherein the nut anti-rotation feature and the shaft anti-rotation feature each comprise at least one of a lug, groove, slot, tab, and flange, and the anti-rotation nut interface geometry and the anti-rotation shaft interface geometry each comprise at least one of a complementary lug, groove, slot, tab, and flange that respectively complement and interface with the nut anti-rotation feature and the shaft anti-rotation feature.

8. The anti-rotation knife-edge seal of claim 5, wherein the anti-rotation knife-edge seal engages with the stack nut and the adjacent rotatable component in a single engaged position.

9. A gas turbine engine comprising:
a rotatable component having an outer surface with anti-rotation shaft interface geometry;
a stack nut engagable on the rotatable component and including an anti-rotation nut interface geometry;
an anti-rotation knife-edge seal comprising:
a first end portion having at least one knife edge;
an opposing second end portion including an outside peripheral edge having a nut anti-rotation feature and an inside peripheral edge having a shaft anti-rotation feature, the nut anti-rotation feature and the shaft anti-rotation feature each complementary to and interfacing with respectively the anti-rotation nut interface geometry and the anti-rotation shaft interface geometry; and an intermediate portion extending between the first end portion and the opposing second end portion;

wherein the first end portion, the opposing second end portion, and the intermediate portion form a one-piece annular seal member that engages the stack nut on the rotatable component to substantially prevent loosening and tightening rotation of the stack nut;

wherein the rotatable component and the anti-rotation knife-edge seal form an interference fit and have a same central axis; and wherein the at least one knife edge is configured to interface with an abradable sealing surface of a surrounding structure of the gas turbine engine to create a seal in response to the stack nut and the rotatable component being engaged with the anti-rotation knife-edge seal; and a closed retaining ring configured to be seated within notches in the stack nut to retain the anti-rotation knife-edge seal in an engaged position.

10. The gas turbine engine of claim 9, wherein the one-piece annular seal member defines the central axis, includes an inner surface and an outer surface, and surrounds an outer surface of the rotatable component.

11. The gas turbine engine of claim 9, wherein the nut anti-rotation feature comprises a plurality of nut anti-rotation features that are circumferentially arranged and spaced-apart around the outside peripheral edge of the opposing second end portion and the shaft anti-rotation feature comprises a plurality of shaft anti-rotation features that are circumferentially arranged and spaced-apart around the inside peripheral edge of the opposing second end portion.

12. The gas turbine engine of claim 11, wherein the plurality of nut anti-rotation features extend radially outward from the outside peripheral edge and the plurality of shaft anti-rotation features extend radially inward from the inside peripheral edge.

13. The gas turbine engine of claim 9, wherein the nut anti-rotation feature is configured to complement and interface with the anti-rotation nut interface geometry of the stack nut and the shaft anti-rotation feature is configured to complement and interface with the anti-rotation shaft interface geometry of the rotatable component to engage the anti-rotation knife-edge seal with the stack nut and the rotatable component and thereby substantially prevent rotation of the stack nut relative to the anti-rotation knife-edge seal and the rotatable component.

14. The gas turbine engine of claim 13, wherein the nut anti-rotation feature and the shaft anti-rotation feature are each selected from a group comprising at least one of a lug, groove, slot, tab, and flange and the anti-rotation nut interface geometry and the anti-rotation shaft interface geometry each comprise at least one of a complementary lug, groove, slot, tab, and flange that respectively complement and interface with the nut anti-rotation feature and the shaft anti-rotation feature.

15. The gas turbine engine of claim 13, wherein the nut anti-rotation feature and the shaft anti-rotation feature each have a selected spacing, count, and size relative to each other, the selected spacing, count, and size calculated such that the anti-rotation knife-edge seal engages with the stack nut and with the rotatable component in a single engaged position.

16. The gas turbine engine of claim 13, wherein the at least one knife edge is configured to interface with the abradable sealing surface.

17. A method for substantially preventing rotation of a stack nut against an adjacent rotatable component, the method comprising:
tightening, to a selected assembly torque, the stack nut and the adjacent rotatable component together to form a stack nut and component assembly;
inserting an anti-rotation knife-edge seal between the stack nut and the adjacent rotatable component of the stack nut and component assembly, the anti-rotation knife-edge seal comprising:
a first end portion having at least one knife edge;
an opposing second end portion including an outside peripheral edge having a nut anti-rotation feature and an inside peripheral edge having a shaft anti-rotation feature; and
an intermediate portion extending between the first end portion and the opposing second end portion;
wherein the first end portion, the opposing second end portion, and the intermediate portion form a one-piece annular seal member;
rotating the anti-rotation knife-edge seal until the nut anti-rotation feature and the shaft anti-rotation feature each respectively engage an anti-rotation nut interface geometry of the stack nut and an anti-rotation shaft interface geometry of the adjacent rotatable component;
substantially preventing the stack nut from tightening or loosening rotation relative to the anti-rotation knife-edge seal and the adjacent rotatable component;
interfacing the at least one knife edge with an abradable sealing surface of a surrounding structure to create a seal in response to the stack nut and the adjacent rotatable component being engaged with the anti-rotation knife-edge seal; and
seating a closed retaining ring within notches in the stack nut to retain the anti-rotation knife-edge seal in an engaged position.

* * * * *